United States Patent [19]
Uchimura et al.

[11] Patent Number: 5,844,805
[45] Date of Patent: Dec. 1, 1998

[54] AUTOMATIC PROGRAMMING APPARATUS FOR NUMERICALLY CONTROLLED ROLL GRINDER

[75] Inventors: Hiroshi Uchimura, Numazu; Takazumi Watanabe; Nobuyuki Endo, both of Mishima; Masayuki Tatara, Numazu; Haruki Kabe, Yokohama; Keiji Shimizu, Hiratsuka; Kazuo Kimura, Fujisawa; Motone Sugiyama, Chigasaki, all of Japan

[73] Assignees: Toshiba Kikai Kabushiki Kaisha, Tokyo; Kanto Special Steel Works, Ltd., Fujisawa, both of Japan

[21] Appl. No.: 704,999

[22] Filed: Aug. 29, 1996

[30] Foreign Application Priority Data

Jun. 6, 1996 [JP] Japan .................................. 8-144561

[51] Int. Cl.⁶ .............................. G06F 19/00; G06G 7/64; G06G 7/66
[52] U.S. Cl. ................................ 364/474.22; 364/474.01; 364/474.06; 451/5
[58] Field of Search ................................ 364/191, 474, 364/474.22, 469.01, 167; 451/5; 318/568

[56] References Cited

U.S. PATENT DOCUMENTS

| | | | |
|---|---|---|---|
| 4,293,913 | 10/1981 | Nishimura et al. | 364/474.27 |
| 4,382,215 | 5/1983 | Barlow et al. | 318/568 |
| 4,513,366 | 4/1985 | Munekata et al. | 364/167 |
| 4,530,046 | 7/1985 | Munekata et al. | 364/191 |
| 4,543,636 | 9/1985 | Noda et al. | 364/474 |
| 4,608,643 | 8/1986 | Breitensteimn et al. | 364/474.06 |
| 4,636,938 | 1/1987 | Broome | 364/191 |
| 4,750,105 | 6/1988 | Ohkawa et al. | 364/191 |
| 4,887,221 | 12/1989 | Davis et al. | 364/474.23 |
| 5,595,525 | 1/1997 | Hayashi et al. | 451/5 |

FOREIGN PATENT DOCUMENTS

| | | |
|---|---|---|
| 0164686 B1 | 12/1985 | European Pat. Off. . |
| 0407611 A1 | 1/1991 | European Pat. Off. . |
| 59-3345269 | 6/1984 | Japan . |
| 08108344 | 4/1996 | Japan . |

OTHER PUBLICATIONS

European Search Report.

*Primary Examiner*—Reba I. Elmore
*Assistant Examiner*—Sheela S. Rao
*Attorney, Agent, or Firm*—Finnegan, Henderson, Farabow, Garrett & Dunner, L.L.P.

[57] ABSTRACT

An automatic programming apparatus is provided to generate a NC program for processing a roll having a cylindrical part and axle parts. The apparatus includes a roll-profile setting module, a process-condition setting module, a process-order setting module and an automatic programming module. The roll-profile setting module establishes dimensional values of the roll between an operator and the apparatus at every locational code, while the process-condition setting module establishes a plurality of process conditions at every process code, interactively. The process-order setting module combines the locational codes with the process codes at every process order, optionally and interactively, so that the process order of the cylindrical part and the axle parts is set while allocating any one of the process conditions. The automatic programming module generates the NC program for executing a series of roll process, on the basis of the combination of the process code and the locational code set by the process-order setting module.

10 Claims, 14 Drawing Sheets

FIG.2

ROLL ID :

\*\* MAIN MENU \*\*

1. SET EDIT ROLL ID

2. SET COMMON PARAMETER

3. SET ROLL PROFILE

4. SET PROCESS CONDITION

5. SET GRINDING CONDITION

6. SET PROCESS ORDER

7. PROGRAM GENERATE

8. TRANSMIT DATA TO F.D.

E. END

FIG.3

SET ROLL ID.   [REVERSAL 1/2]   P-1   [OVERWRITE]

| NO. | ROLL. ID | DRAWING NO. | Nos. OF STEPS FOOT | Nos. OF STEPS HEAD | MATERIAL | CYLINDER DIA. | TOTAL LENGTH | CENTER COUNTER | CENTER DIA. | CENTER ANGLE | ACCU- RACY |
|---|---|---|---|---|---|---|---|---|---|---|---|
| 1 | TEST1 | 001-9833A-01-4 | 8 | 10 | KRX452 | 770.500 | 6950.000 | 3.0 | 60.0 | 75 | 2 |
| 2 | | | | | | | | | | | |
| 3 | | | | | | | | | | | |
| 4 | | | | | | | | | | | |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |
| 11 | | | | | | | | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |
| 17 | | | | | | | | | | | |

PUSH ID. SET AFTER SELECTING EDIT ROLL

| DRAW NO. SORT | ID SORT | DRAW NO. SEARCH | STEP NO. SEARCH | QUIT | NEW ENTRY | ID. DELETE | ID. COPY | DISPLAY CHANGE | ID. SET |
|---|---|---|---|---|---|---|---|---|---|
| f·1 | f·2 | f·3 | f·4 | f·5 | f·6 | f·7 | f·8 | f·9 | f·10 |

FIG.4A

| SET COMMON PARAMETER | | ROLL ID : TEST1 P-1 [OVERWRITE] | |
|---|---|---|---|
| PARAMETER NO. | VALUE | DIMEN-SION | COMMENTS |
| 00001 | 1 | (1~4) | ROLL MATERIAL |
| 00002 | .0 | (°C) | TEMP. DIFFERENCE OF MASTER SET |
| 00003 | 10.0 | (mm) | ALLOWANCE OF ROLL SHIFT |
| 00004 | 20 | (/min) | REVOLUTIONS OF ROLL AT MEASURING |
| 00005 | 50 | (mm/min) | CIRCUMFERENTIAL SPEED OF ROLL FLAW DETECTION |
| 00006 | 40 | (/min) | ROTATING SPEED OF ROLL AT DRAINING OIL-COATING |
| 00007 | 1/3 | | OVERHANG OF GRINDSTONE AT CORNER |
| 00008 | 1.00 | (mm) | RELIEF OF GRINDSTONE AT NECK |
| 00009 | 10 | (%) | DOWNWARD RATIO OF ROTATING SPEED OF CYCLIC GRINDSTONE |
| 00010 | 60 | (sec) | CHANGE PERIOD OF ROTATION OF CYCLIC GRINDSTONE |
| 00011 | 20 | (sec) | MAX. COUNTS OF TENTATIVE TRAVERSE CUT |
| 00012 | 2 | | MAX. LOOP COUNTS(AT SWING CORRECT CUT) |
| 00013 | 1.00 | | HEADSTOCK CIRCUM. SPD. COEFFICIENT(AT SWING CORRECT CUT) |
| 00014 | 1.00 | | GRINDSTONE CIRCUM. SPD. COEFFICIENT(AT SWING CORRECT CUT) |
| 00015 | 1.00 | | FEED SPEED COEFFICIENT(AT SWING CORRECT CUT) |
| 00016 | 1.00 | | CUTTING COEFFICIENT(AT SWING CORRECT CUT) |
| 00017 | .50 | | CUTTING AMOUNT COEFFICIENT |

INPUT VALUE
▪

| CHANGE | +CHANGE | DELETE | FULL DELETE | | QUIT | | | | SAVE DATA |
|---|---|---|---|---|---|---|---|---|---|
| f·1 | f·2 | f·3 | f·4 | f·5 | f·6 | f·7 | f·8 | f·9 | f·10 |

FIG. 4B

| SET COMMON PARAMETER | | ROLL ID: TEST1 P-2 [OVERWRITE] | |
|---|---|---|---|
| PARAMETER NO. | VALUE | DIMENSION | COMMENTS |
| 000018 | 1.0 | (um/A) | ASSESSED MACHINING ALLOWANCE OF 1 PASS(CURRENT) |
| 000019 | 1.00 | (um/um) | ASSESSED MACHINING ALLOWANCE OF 1 PASS(CUT) |
| 000020 | 3 | | MAX.TRAVERSE COUNTS AT SPECIFYING ZERO-CUT CURRENT |
| 000021 | .40 | | CYLINDER COEFFICIENT FOR JUDGING DEVIATION |
| 000022 | .40 | | AXLE COEFFICIENT FOR JUDGING DEVIATION(ON-LINE) |
| 000023 | .40 | | AXLE COEFFICIENT FOR JUDGING DEVIATION(PROSPECTS) |
| 000024 | .50 | | CYLINDER COEFFICIENT FOR CALCULATING CUT |
| 000025 | .50 | | AXLE COEFFICIENT FOR CALUCULATING CUT(ON-LINE) |
| 000026 | .80 | | AXLE COEFFICIENT FOR CALUCULATING CUT(PROSPECTS) |
| 000027 | .5 | (mm) | GAP AT RAPID ACCESS |
| 000028 | 5 | (mm) | WORK PROGRAM CHECK CLEARANCE |
| 000029 | 10.00 | (mm) | RELIEF OF GRINDSTONE AT DRESSING |
| 000030 | 1.000 | (mm) | ADDING VALUE IN SOFTWARE |
| 000031 | .0 | (mm) | LENGTH OF SPECIAL CENTER |
| 000032 | 10.00 | (A) | CURRENT DEVIATION ALLOWANCE OF GRINDSTONE IN TENTATIVE PROCESSING |
| 000033 | 10.0 | (um) | DEVIATION ALLOWANCE OF AXLE SWING PROCESSING |
| 000034 | 4.5 | (rev) | SHORT AXLE TARRY TIME |

| INPUT VALUE | | | | | | | | | |
|---|---|---|---|---|---|---|---|---|---|
| CHANGE | +CHANGE | DELETE | FULL DELETE | QUIT | | | | | SAVE DATA |
| f·1 | f·2 | f·3 | f·4 | f·5 | f·6 | f·7 | f·8 | f·9 | f·10 |

FIG.5A

SET OF ROLL PROFILE  
(FOOTSTOCK SIDE)     (REVERSAL 1/2)     ROLL ID : TEST1 P-1     [OVERWRITE]

| CODE | AXLE LENGTH | DIAMETER | TAPER | UPPER TOLERANCE | LOWER TOLERANCE | CORNER | NECK | DEVIATION | POLISHING | LONG BASE | KEY | CENTERING | PERIPHERAL GROOVE | AXIS SEIZURE |
|---|---|---|---|---|---|---|---|---|---|---|---|---|---|---|
| K21 | //85.000// | 175.000 | 0.000 | .000 | .000 | 0 | 0 | .0 | 00 | 0000 | 00 | 000 | 0000 | NO |
| K22 | 300.000 | 177.000 | 0.000 | .000 | .000 | 0 | 0 | .0 | 00 | 0000 | 00 | 000 | 0000 | NO |
| K23 | 90.000 | 178.000 | 0.000 | -.043 | -.068 | 5 | 2 | 10.0 | 20 | 0000 | 11 | 000 | 0000 | NO |
| K24 | 186.000 | 179.000 | 0.000 | -.043 | -.068 | 5 | 2 | 5.0 | 20 | 0000 | 00 | 170 | 0000 | NO |
| K25 | 89.000 | 180.000 | 0.000 | -.175 | -.235 | 5 | 10 | 1.0 | 41 | 0000 | 00 | 000 | 0000 | NO |
| K26 | 137.000 | 215.000 | 0.000 | .000 | -.115 | 10 | 20 | 3.0 | 30 | 0000 | 00 | 000 | 0000 | NO |
| K27 | 348.000 | 270.000 | 0.000 | -.210 | -.250 | 15 | 10 | 8.0 | 40 | 0000 | 00 | 000 | 0000 | NO |
| K28 | 115.000 | 300.000 | 0.000 | .000 | .000 | 0 | 0 | .0 | 00 | 0000 | 00 | 000 | 0000 | NO |
| K29 | 300.000 | 390.000 | 0.000 | .100 | -.100 | 3 | 15 | 2.0 | 30 | 1360 | 00 | 000 | 0000 | NO |
| K30 | | | | | | | | | | | | | | |
| K31 | | | | | | | | | | | | | | |
| K32 | | | | | | | | | | | | | | |
| K33 | | | | | | | | | | | | | | |
| K34 | | | | | | | | | | | | | | |
| K35 | | | | | | | | | | | | | | |
| K36 | | | | | | | | | | | | | | |
| K37 | | | | | | | | | | | | | | |

INPUT LENGTH

| CHANGE | LINE INSERT | LINE DELETE | FULL DELETE | QUIT | INTERFERENCE CHECK | COPY DATA | DRAW ROLL | CHANGE DISPLAY | SAVE DATA |
|---|---|---|---|---|---|---|---|---|---|
| f·1 | f·2 | f·3 | f·4 | f·5 | f·6 | f·7 | f·8 | f·9 | f·10 |

FIG.5B

SET OF ROLL PROFILE(HEADSTOCK SIDE)  (REVERSAL 1/2)  ROLL ID : TEST1 P-3  [OVERWRITE]

| CODE | AXLE LENGTH | DIAMETER | TAPER | UPPER TOLERANCE | LOWER TOLERANCE | CORNER | NECK | DEVIATION | POLISHING | LONG BASE | KEY | CENTERING | PERIPHERAL GROVE | AXIS SEIZURE |
|------|-------------|----------|-------|-----------------|-----------------|--------|------|-----------|-----------|-----------|-----|-----------|------------------|--------------|
| K61  | 340.000     | 255.000  | 0.000 | .30             | -.30            | 25     | 40   | 1.0       | 20        | 0000      | 00  | 000       | 0000             | YES          |
| K62  | 136.000     | 269.000  | 0.000 | -.056           | -.088           | 15     | 0    | 2.0       | 20        | 0000      | 11  | 145       | 1045             | NO           |
| K63  | 344.000     | 270.000  | 0.000 | -.210           | -.250           | 5      | 10   | 3.0       | 41        | 0000      | 00  | 000       | 0000             | NO           |
| K64  | 130.000     | 300.000  | 0.000 | .000            | .000            | 0      | 0    | .0        | 00        | 0000      | 00  | 000       | 0000             | NO           |
| K65  | 300.000     | 390.000  | 0.000 | .100            | -.100           | 3      | 15   | 5.0       | 30        | 1360      | 00  | 000       | 0000             | NO           |
| K66  |             |          |       |                 |                 |        |      |           |           |           |     |           |                  |              |
| K67  |             |          |       |                 |                 |        |      |           |           |           |     |           |                  |              |
| K68  |             |          |       |                 |                 |        |      |           |           |           |     |           |                  |              |
| K69  |             |          |       |                 |                 |        |      |           |           |           |     |           |                  |              |
| K70  |             |          |       |                 |                 |        |      |           |           |           |     |           |                  |              |
| K71  |             |          |       |                 |                 |        |      |           |           |           |     |           |                  |              |
| K72  |             |          |       |                 |                 |        |      |           |           |           |     |           |                  |              |
| K73  |             |          |       |                 |                 |        |      |           |           |           |     |           |                  |              |
| K74  |             |          |       |                 |                 |        |      |           |           |           |     |           |                  |              |
| K75  |             |          |       |                 |                 |        |      |           |           |           |     |           |                  |              |
| K76  |             |          |       |                 |                 |        |      |           |           |           |     |           |                  |              |
| K77  |             |          |       |                 |                 |        |      |           |           |           |     |           |                  |              |

INPUT LENGTH ■

| CHANGE | LINE INSERT | FULL DELETE | LINE DELETE | QUIT | INTER-FERENCE CHECK | COPY DATA | DRAW ROLL | CHANGE DISPLAY | SAVE DATA |
|--------|-------------|-------------|-------------|------|---------------------|-----------|-----------|----------------|-----------|
| f·1    | f·2         | f·3         | f·4         | f·5  | f·6                 | f·7       | f·8       | f·9            | f·10      |

FIG.6

| SET OF ROLL PROFILE | (REVERSAL 1/2) | ROLL ID : TEST1 | P-2 | [OVERWRITE] |

SET OF ROLL PROFILE OF CYLINDRICAL PART     CODE : K01

CYLINDER PROFILE : SIN. CURVE

```
                  LENGTH :  500.000
                DIAMETER :  480.000
         UPPER TOLERANCE :     .500
         LOWER TOLERANCE :     .500
           CORNER LENGTH :    25
  DEVIATION(FOOTSTOCK SIDE) :  1.0
DEVIATION(CENTER STOCK SIDE) :  1.0
  DEVIATION(HEADSTOCK SIDE) :  1.0
               DRAWING R :    30
            PROCESSING R :    30
Z-SHIFT VALUE AT R-PROCESSING : 20
```

INPUT CYLINDRICAL LENGTH

| CHANGE | +CHANGE | DELETE | FULL DELETE | QUIT | NEW CYLINDRICAL PART PROFILE EDITING | CYLINDRICAL PART PROFILE EDITING | DATA COPY | DISPLAY CHANGE | SAVE DATA |
|---|---|---|---|---|---|---|---|---|---|
| f·1 | f·2 | f·3 | f·4 | f·5 | f·6 | f·7 | f·8 | f·9 | f·10 |

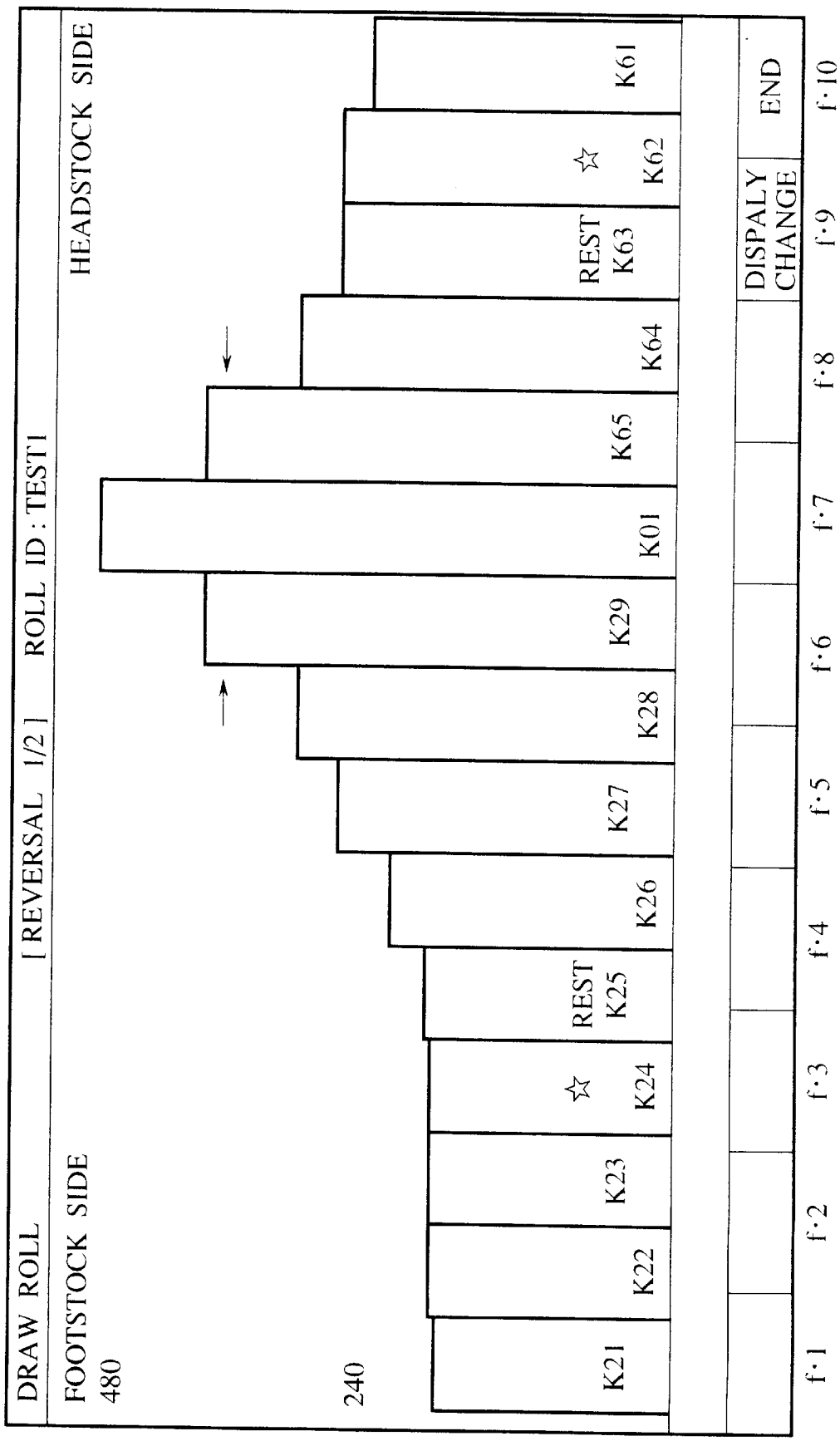

FIG. 8A

SET OF PROCESSING CONDITION    ROLL ID : TEST1 P-1    [OVERWRITE]

| COND. CODE | METHOD OF SUPPORT-ING ROLL | | GRINDING PATTERN | | LEFT ALLOW-ANCE | CIR.SPD. MAIN SPINDLE | CIR.SPD. GRIND-STONE | FEED SPD. | CUTTING DIMENSION | | ZERO CUT | | TARRY TIME | FLAW DETEC-TION | HIGH -C | CY-CLIC | GRIND STONE |
|---|---|---|---|---|---|---|---|---|---|---|---|---|---|---|---|---|---|
| | | | | | | | | | μm | A | TIMES | A | | | | | |
| J00 | CENTER | AXIS | ROUGH | | 0.100 | 15 | 1400 | 50 | 50 | 0 | 2 | 0 | 0.0 | NO | NO | NO | 1 |
| J01 | CENTER | AXIS | DEVIATION | | 0.100 | 15 | 1400 | 50 | 50 | 0 | 2 | 0 | 0.0 | NO | NO | NO | 1 |
| J02 | CENTER.BEAR-ING METAL | AXIS | DEVIATION | | 0.100 | 15 | 1400 | 50 | 50 | 0 | 2 | 0 | 0.0 | NO | NO | NO | 1 |
| J03 | CENTER.BEAR-ING METAL | AXIS | ON | CENTER | 0.100 | 15 | 1400 | 50 | 50 | 0 | 2 | 0 | 0.0 | NO | NO | NO | 1 |
| J04 | CENTER.BEAR-ING METAL | AXIS | SIGHT | CENTER | 0.100 | 15 | 1400 | 50 | 50 | 0 | 2 | 0 | 0.0 | NO | NO | NO | 1 |
| J05 | CENTER.BEAR-ING METAL | AXIS | ON | 2G | 0.100 | 15 | 1400 | 25 | 50 | 0 | 2 | 0 | 0.0 | NO | NO | NO | 1 |
| J06 | CENTER.BEAR-ING METAL | AXIS | SIGHT | 2G | 0.050 | 15 | 1400 | 25 | 50 | 0 | 2 | 0 | 0.0 | NO | NO | NO | 1 |
| J07 | CENTER.BEAR-ING METAL | AXIS | ON | 3G | 0.050 | 15 | 1400 | 25 | 10 | 0 | 2 | 0 | 0.0 | NO | NO | NO | 2 |
| J08 | CENTER.BEAR-ING METAL | AXIS | SIGHT | 3G | 0.050 | 15 | 1400 | 25 | 10 | 0 | 2 | 0 | 0.0 | NO | NO | NO | 2 |
| J09 | BEARING METAL | AXIS | ON | 3G | 0.050 | 15 | 1400 | 25 | 10 | 0 | 2 | 0 | 0.0 | NO | NO | NO | 2 |
| J10 | BEARING METAL | AXIS | SIGHT | 3G | 0.020 | 15 | 1400 | 25 | 10 | 0 | 2 | 0 | 0.0 | NO | NO | NO | 2 |
| J11 | BEARING METAL | AXIS | ON | 4G CENTER | 0.020 | 15 | 1400 | 25 | 20 | 0 | 2 | 0 | 0.0 | NO | NO | NO | 2 |
| J12 | BEARING METAL | AXIS | SIGHT | 4G CENTER | 0.020 | 15 | 1400 | 25 | 20 | 0 | 2 | 0 | 0.0 | NO | NO | NO | 2 |
| J13 | BEARING METAL | AXIS | ON | 4G | 0.000 | 15 | 1400 | 25 | 10 | 0 | 0 | 10 | 0.0 | NO | NO | NO | 2 |
| J14 | BEARING METAL | AXIS | SIGHT | 4G | 0.000 | 15 | 1400 | 25 | 10 | 0 | 0 | 10 | 0.0 | NO | NO | NO | 2 |
| J15 | CENTER.BEAR-ING METAL | CYLIN-DER | DEVIATION | | 0.100 | 15 | 1400 | 5 | 50 | 0 | 2 | 0 | 0.0 | NO | NO | NO | 2 |
| J16 | CENTER.BEAR-ING METAL | CYLIN-DER | ON | CENTER | 0.100 | 15 | 1400 | 50 | 0 | 60 | 0 | 30 | 0.0 | NO | NO | NO | 2 |

| CHANGE | LINE COPY | DELETE | FULL DELETE | QUIT | | COPY DATA | DRAW ROLL | | SAVE DATA |
|---|---|---|---|---|---|---|---|---|---|
| f·1 | f·2 | f·3 | f·4 | f·5 | f·6 | f·7 | f·8 | f·9 | f·10 |

FIG. 8B

SET OF PROCESSING CONDITION  ROLL ID : TEST1 P-1  [OVERWRITE]

| COND. CODE | METHOD OF SUPPORT-ING ROLL | GRINDING PATTERN | | | LEFT ALLOW-ANCE | CIR.SPD. MAIN SPINDLE | CIR.SPD. GRIND-STONE | FEED SPD. | CUTTING DIMENSION | | ZERO CUT | | TARRY TIME | FLAW DETEC-TION | HIGH-C | CY-CLIC | GRIND STONE |
|---|---|---|---|---|---|---|---|---|---|---|---|---|---|---|---|---|---|
| | | | | | | | | | μm | A | TIMES | A | | | | | |
| J17 | CENTER,BEAR-ING METAL | CYLINDER | ON | 3G | 0.100 | 15 | 1400 | 50 | 50 | 0 | 2 | 0 | 0.0 | NO | NO | NO | 1 |
| J18 | BEARING METAL | CYLINDER | ON | 3G | 0.100 | 15 | 1400 | 50 | 50 | 0 | 2 | 0 | 0.0 | NO | NO | NO | 1 |
| J19 | BEARING METAL | CYLINDER | ON | 4G CENTER | 0.100 | 15 | 1400 | 50 | 50 | 0 | 2 | 0 | 0.0 | NO | NO | NO | 2 |
| J20 | BEARING METAL | CYLINDER | ON | 4G | 0.100 | 15 | 1400 | 50 | 50 | 0 | 2 | 0 | 0.0 | NO | NO | NO | 2 |
| J21 | | | | | 0.000 | 0 | 0 | 0 | 0 | 0 | 0 | 0 | 0.0 | NO | NO | NO | 0 |
| J22 | | | | | 0.000 | 0 | 0 | 0 | 0 | 0 | 0 | 0 | 0.0 | NO | NO | NO | 0 |
| J23 | | | | | 0.000 | 0 | 0 | 0 | 0 | 0 | 0 | 0 | 0.0 | NO | NO | NO | 0 |
| J24 | | | | | 0.000 | 0 | 0 | 0 | 0 | 0 | 0 | 0 | 0.0 | NO | NO | NO | 0 |

| CHANGE | LINE COPY | DELETE | FULL DELETE | QUIT | | COPY DATA | DRAW ROLL | | SAVE DATA |
|---|---|---|---|---|---|---|---|---|---|
| f·1 | f·2 | f·3 | f·4 | f·5 | f·6 | f·7 | f·8 | f·9 | f·10 |

FIG.9

| SET OF GRINDING CONDITION | | ROLL ID : TEST1 P-1 [OVERWRITE] | | |
|---|---|---|---|---|
| | MAGAZINE NO.1 | MAGAZINE NO.2 | MAGAZINE NO.3 | MAGAZINE NO.4 |
| SORT | CBN-60 | WA/GC60 | WA-80 | WA-220 |
| DIAMETER | 760 | 890 | 915 | 915 |
| USABLE MIN. DIA. | 756 | 540 | 540 | 540 |
| WIDTH mm | 75 | 100 | 100 | 100 |
| MAX. OF CIRCUM. SPD. m/min | 3500 | 2700 | 2700 | 2700 |
| SELECTED DRESSER | ROTARY | DIA | DIA | DIA |
| PROFILE | STRAIGHT | DRESS ANGLE LEFT | DRESS ANGLE RIGHT | SIN. CURVE |
| PROFILE PARAMETER | 0.000 | 20.000 | 20.000 | 10.000 |
| DRESSING FEED SPD. | 10.000 | 10.000 | 10.000 | 10.000 |
| DRESSING DEPTH/PASS | 1.000 | 1.000 | 1.000 | 1.000 |
| DRESSING PASS TIMES | 3 | 3 | 3 | 3 |
| CIRCUM. SPD. OF DRESSING GRINDSTONE | 800 | 800 | 800 | 800 |

| CHANGE | DELETE | FULL DELETE | QUIT | | COPY DATA | DRAW ROLL | | SAVE DATA |
|---|---|---|---|---|---|---|---|---|
| f·1 | f·2 | f·3 | f·4 | f·5 | f·6 | f·7 | f·8 | f·9 | f·10 |

FIG.10

| SET OF PROCESSING ORDER | | | [REVERSAL 1/2] ROLL ID : 123456 P-1 [OVERWRITE] | |
|---|---|---|---|---|
| ORDER | OBJECT | | PROCESS CONTENT | PARAMETER |
| 001 | COMMON | | GRINDING | OBJECT MENU |
| 002 | COMMON | | EXCHANGE OF GRINDSTONE | |
| 003 | COMMON | | WORK CHECK | 1. COMMON |
| 004 | COMMON | | ROLL MEASUREMENT HEAD→FOOT | 2. FOOTSTOCK SIDE |
| 005 | COMMON | | ROLL MEASUREMENT FOOT→HEAD | 3. HEADSTOCK SIDE |
| 006 | K24 | J00 : | CENTER AXLE TENTATIVE : 2G | 4. CYLINDER K01 |
| 007 | K62 | J00 : | CENTER AXLE TENTATIVE : 2G | |
| 008 | COMMON | | AUTO. CENTERING | |
| 009 | K25 | J01 : | CENTER AXLEDEVIATION : 4G REST | |
| 010 | K63 | J01 : | CENTER AXLEDEVIATION : 4G REST | |
| 011 | COMMON | | CONTACT OF BEARING METAL | |
| 012 | CYLINDER | J15 : | CENTER BEARING METAL CYLINDER DEVIATION | |
| 013 | K25 | J03 : | CENTER BEARING METAL AXLE ON MID : 4G REST | |
| 014 | K63 | J03 : | CENTER BEARING METAL AXLE ON MID : 4G REST | |
| 015 | CYLINDER | J16 : | CENTER BEARING METAL CYLINDER ON MID | |
| 016 | COMMON | | AUTO DRESSING | |
| 017 | K27 | J04 : | CENTER BEARING METAL AXLE SIGHT MID : 4G | |

SELECT OBJECT

| CHANGE | INSERT | DELETE | FULL DELETE | QUIT | AUTO PRO-GRAMMING | COPY DATA | DRAW ROLL | CHANGE DISPLAY | SAVE DATA |
|---|---|---|---|---|---|---|---|---|---|
| f·1 | f·2 | f·3 | f·4 | f·5 | f·6 | f·7 | f·8 | f·9 | f·10 |

FIG.11

| OPERATION | PROGRAM | SORT OF CODE |
|---|---|---|
| REVERSE OF MEASURING ARM | M88 | MACRO CODE |
| CALL OF PROFILE | G441010K100 | NC CODE |
| MOVE OF LARGE DIAMETRICAL END | G400P1 | MACRO CODE |
| ROLL ROTATION | M04S20 | NC CODE |
| GRINDSTONE ROTATION | M46E100 | NC CODE |
| SET OF ROLL DIAMETER | G60R2b1 | MACRO CODE |
| ----- | ----- | ----- | ns

AUTOMATIC PROGRAMMING APPARATUS FOR NUMERICALLY CONTROLLED ROLL GRINDER

BACKGROUND OF THE INVENTION

1. Field of the Invention

The present invent ion relates to an automatic programming apparatus which generates a numerical control (NC) program for processing a roll, and more particularly, it relates to an automatic programming apparatus for generating the NC program which is applicable to a NC roll grinder for grinding cylindrical and axle parts of the roll.

2. Description of the Related Art

Generally, a large roll includes a cylindrical part and multi-stage axle parts at both sides of the cylindrical part. The cylindrical part and the axle parts are ground by a NC roll grinder.

For processing a roll, an operator inputs dimensional values of the roll and various process conditions for each of the cylindrical and axle parts thereby generating a partial program for each part. As a result, the cylindrical and axle parts are processed by combining the dimensional values with the process conditions. The dimensional values of the roll are, for example, an axle length, a diameter, a roll profile, etc. Some examples of the various process conditions are a roll supporting method, a rotating speed of a main spindle, a feed rate, etc.

In a conventional NC program for processing a roll, the operator has to set the process conditions for every part of the cylindrical and axle parts because the process conditions are set for a corresponding dimensional value for every part of the cylindrical and axle parts. Consequently, when there are many steps in the axle parts of the roll, the number of partial programs will increase correspondingly and the setting of the process conditions from roughing to finishing will be so complicated that enormous time is required to generate the NC program and errors occur increasingly.

In addition, changing the process order of the respective parts of the roll, the axle length, the diameter, the roll profile, or the process conditions, even for partially similar manufacturing processes, requires the modification of the NC program. Thus, the operators are required to have a considerable NC programming knowledge.

Thus, the operators need to actively manipulate the grinding of a large roll having many axle steps.

SUMMARY OF THE INVENTION

An object of the present invention is to provide an automatic programming apparatus capable of generating the NC program interactively (i.e. the form of dialogue between the operator and the apparatus) in a short time and without making mistakes even for a roll with many axle steps. The invention also makes it possible to change the process order of the respective parts, the dimensional values (e.g., the axle length, the diameter, the roll-profile, etc.) and some of the process conditions without requiring considerable NC programming knowledge.

The object of the present invention described above can be accomplished by an automatic programming apparatus for programming a numerical control program to apply various processes to a roll having a cylindrical part and at least one stepped axle part formed at both ends of the cylindrical part. The cylindrical part and the axle parts of the apparatus are represented by locational codes and the various processes are represented by process codes. The apparatus comprises a roll-profile setting means for interactively setting dimensional values of the roll for each of the locational codes between an operator and the apparatus. A process-condition setting means interactively sets various process conditions for each of the process codes between the operator and the apparatus. A process-order setting means optionally and interactively combines the locational codes with the process codes for each of process order of the roll between the operator and the apparatus, thereby determining the process order of the cylindrical part and the axle parts while allocating the process conditions to the cylindrical part and the axle parts. An automatic programming means programs a numerical control program for executing a series of roll process based on the combination of the process code and the locational code set by the process-order setting means. In order to generate the numerical control program, the automatic programming means operates to obtain the roll-profile characteristics of the corresponding locational code from the roll-profile setting means and obtain the process conditions of the corresponding process code from the process-condition setting means, thereby producing partial programs for the cylindrical part and the axle parts. The automatic programming means further operates to arrange the partial programs so that the partial programs are executed in accordance with the process order set by the process-order setting means.

In the above-mentioned automatic programming apparatus of the invention, the dimensional values, such as axle lengths, diameters and roll-profiles, are interactively set for every locational code by the roll-profile setting means, while the process conditions are interactively set for every process code by the process-condition setting means. Similarly, by the process-order setting means, the locational codes can be optionally and interactively combined with the process codes every process order, while the process order of the cylindrical and axle parts of the roll can be set and the process conditions can be allocated to the respective parts.

Further, by the automatic programming means, partial programs for the respective parts can be generated based on the combinations of the locational codes with the process codes established by the process order setting means. Then, these partial programs are rearranged so as to be executed in accordance with the process order set by the process-order means, whereby the NC program for carrying out a series of roll processes can be completed.

According to the present invention, there is also provided an automatic programming apparatus for programming a numerical control program to apply various processes on a roll having a cylindrical part and at least one stepped axle part formed on both ends of the cylindrical part. The cylindrical part and the axle parts of the apparatus are represented by locational codes and the various processes are represented by process codes. The apparatus comprises a roll-profile setting means for interactively setting dimensional values of the roll for each of the locational codes between an operator and the apparatus. A tool condition setting means interactively sets information of tools between the operator and the apparatus at every number of a tool magazine of an automatic tool changer. A process-condition setting means interactively sets various process conditions for each of the process codes between the operator and the apparatus. A process-order setting means optionally and interactively combines the locational codes with the process codes for each of process order of the roll between the operator and the apparatus, thereby determining the process order of the cylindrical part and the axle parts while allocating the process conditions to the cylindrical part and the axle parts. An automatic programming means programs a numerical control program for executing a series of roll process based on the combination of the process code. The locational code and the number of the tool magazine are set by the process-order setting means. In order to generate the numerical control program, the automatic programming means operates to obtain the roll-profile characteristics of the corresponding locational code from the roll-profile setting means and obtain the process conditions of the corresponding process code from the process-condition setting means and obtain the tool inflammations of the corresponding number of the tool magazine from the tool condition setting means, thereby generating partial programs for the constituents of the cylindrical part and the axle parts. The automatic programming means further operates to arrange the partial programs so that the partial programs are executed in accordance with the process order set by the process-order setting means.

Also in the above-mentioned automatic programming apparatus, the dimensional values, such as axle lengths, diameters and roll-profiles, are interactively set for every locational code by the roll-profile setting means. Further, the tool information is interactively set for every number of a tool magazine by the tool-condition setting means, while the process conditions, including an indication of the tool being on use, are interactively set every process code by the process-condition setting means. Similarly, by the process-order setting means, the locational codes can be optionally and interactively combined with the process codes every process order, while the process order of the cylindrical and axle parts of the roll can be set and the process conditions can be allocated to the respective parts. Further, by the automatic programming module, the partial programs for the respective parts can be generated based on the combinations of the locational codes with the process codes set by the process order setting means. Then, these partial programs are rearranged so as to be executed in accordance with the process order set by the process-order means, whereby the NC program for carrying out a series of roll processes can be completed.

Preferably, the automatic programming means sets respective process-starting positions that the partial programs define, on the basis of the whole roll-profile originating in the axle lengths of the respective parts, the diameters, the roll-profiles, etc., set by the roll-profile setting means. In this case, by the automatic programming means, the respective process-starting positions are set on the basis of the whole roll-profile originating in the axle lengths of the respective parts, the diameters, the roll-profiles, etc., set by the roll-profile setting means.

In the present invention, more preferably, the process-order setting means is capable of setting common process characteristics in processing the respective parts of the roll, such as "stand-by" operations and measurement operations.

It is also preferable that, in the above-mentioned apparatus, each partial program includes a program described by numerical control (NC) codes and a program described by macro-codes containing a plurality of NC codes.

More preferably, the NC program comprises a program containing the process conditions, the moving conditions, etc. and another program containing the common parameters, the roll-profile and the tool conditions.

It should be noted that the automatic programming apparatus of the invention may be constituted by a computer system, such as a personal computer. In such a case, each of the roll-profile setting means, the process-condition setting means, the process-order setting means, the tool-condition setting means and the automatic programming means can be realized by software. These and other objects and features of the present invention will become more fully apparent from the following description and the accompanied drawings.

BRIEF DESCRIPTION OF THE DRAWINGS

FIG. 2 is an explanatory diagram showing an example of display for a main menu;

FIG. 3 is an explanatory diagram showing an example of display for setting a roll identifier (ID);

FIGS. 4A and 4B are explanatory diagrams showing respective examples of display for setting the common parameters;

FIGS. 5A and 5B are explanatory diagrams showing respective examples of display for setting roll profiles for the axle parts;

FIG. 6 is an explanatory diagram showing an example of display for setting roll profiles for the cylindrical part;

FIG. 7 is an explanatory diagram showing an example of the roll profile on display;

FIGS. 8A and 8B are explanatory diagrams showing respective examples of display for setting the process conditions;

FIG. 9 is an explanatory diagram showing an example of display for setting the grinding conditions;

FIG. 10 is an explanatory diagram showing an example of display for setting the process order; and FIG. 11 is an explanatory diagram showing an example of the partial program.

DESCRIPTION OF THE PREFERRED EMBODIMENT

Figure 1:
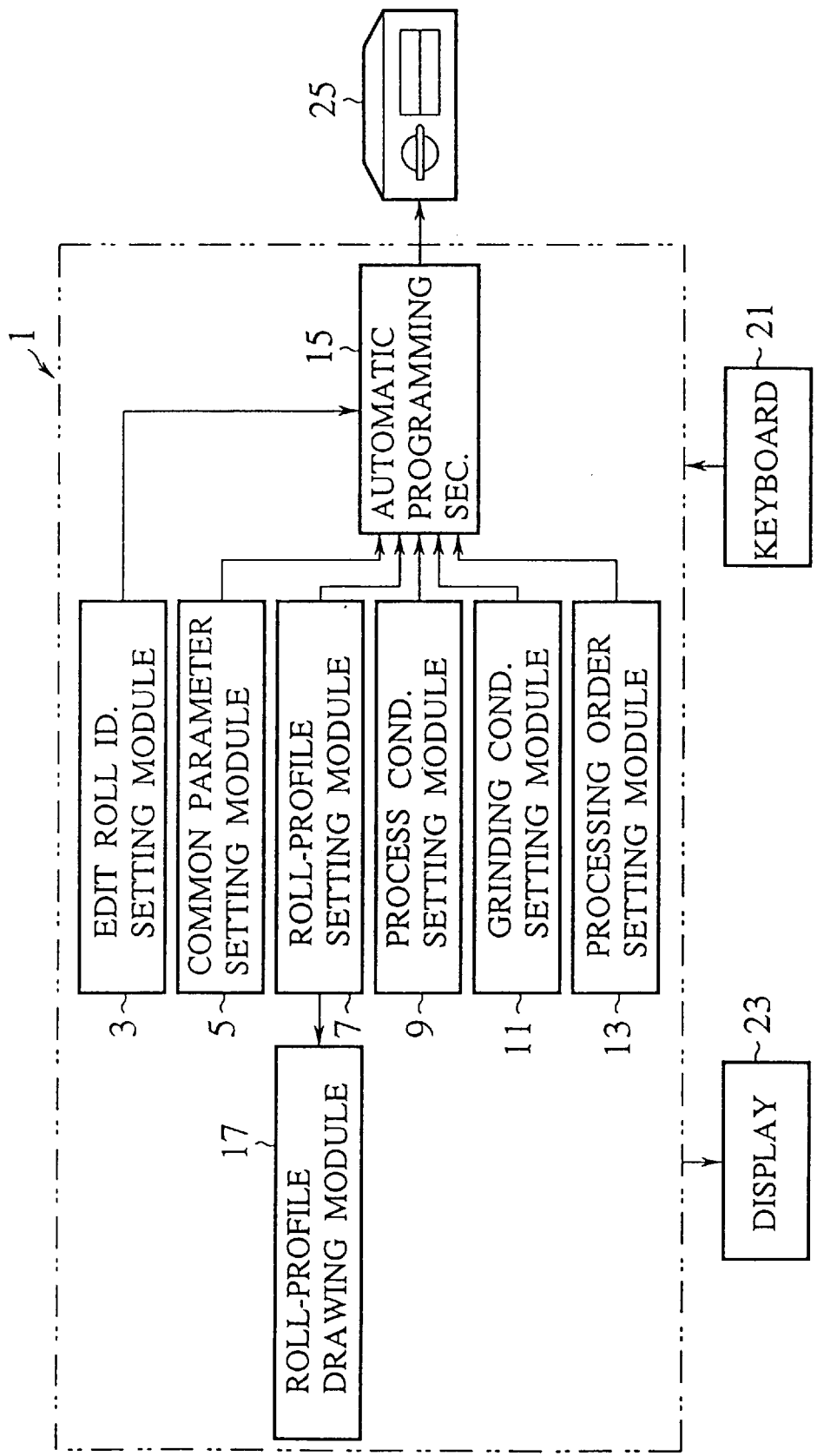
FIG. 1 is a block diagram showing components of an automatic programming apparatus for a NC roll grinder in accordance with the present invention.

An embodiment of the present invention will be described with reference to the drawings. FIG. 1 shows an automatic NC (numerical control) programming apparatus for processing a roll in accordance with the present invention. The apparatus here is applied for a NC roll grinder quipped with an automatic tool (grindstone) changer. The automatic NC programming apparatus 1 comprises an edit roll ID (identifier) setting module 3, a common parameter setting module 5, a roll-profile setting module 7, a process condition setting module 9, a grinding condition setting module 11 as a tool condition setting module, a process-order setting module 13, an automatic programming module 15 and a roll-profile drawing module 17.

The automatic NC programming apparatus 1 is constituted by a personal computer for controlling operations of the edit roll ID setting module 3, the common parameter setting module 5, the roll-profile setting module 7, the process condition setting module 9, the grinding condition setting module 11, the process order setting module 13, the automatic programming module 15 and the roll-profile sketch process module 17 in accordance with programs. A keyboard 21, a display 23 such as CRT, and a floppy disc driver (FDD) 25 are electrically connected to the automatic NC programming apparatus 1.

When the system program is activated, the automatic NC programming apparatus 1 displays a main menu on the display 23, as shown in FIG. 2. Based on this main menu, an operator can select any one of various items consisting of "SET EDIT ROLL ID", "SET COMMON PARAMETER", "SET ROLL-PROFILE", "SET PROCESS CONDITION", "SET GRINDING CONDITION", "SET PROCESS ORDER", "PROGRAM GENERATE" and "TRANSMIT DATA TO F.D.".

In this main menu, when "SET EDIT ROLL ID" is selected, the edit roll ID setting module 3 displays a roll ID setting picture on the display 23, as shown in FIG. 3. In the roll ID setting picture, a drawing number, numbers of steps in an axle part on the side of footstock, numbers of steps in an axle part on the side of headstock, materials, a diameter of the cylindrical part, a total length, center information and accuracy are interactively set for each roll ID between the operator and the computer. Thereafter, the roll ID indicated in such an interactive manner can be set to a specific roll as an object of edit by a "f10" key.

On the other hand, when the item of "SET COMMON PARAMETER" in the main menu is selected, the common parameter setting module displays common parameter setting pictures on the display 23, as shown in FIGS. 4A and 4B. Then, in this common parameter setting picture, so-called "common" parameters necessary for generating programs, i.e. roll materials, respective allowances, various kinds of coefficients, etc., are set interactively. It should be noted that these common parameters can also be changed or deleted freely in this common parameter setting picture.

When the item of "SET ROLL-PROFILE" is selected in the main menu, the roll-profile setting module 7 is activated. The module 7 serves to display roll-profile setting pictures on the display 23, as shown in FIGS. 5A, 5B and 6. In the roll-profile setting pictures of FIGS. 5A and 5B, respective axle parts on both sides of the footstock and the headstock are represented by individual codes K21 to 37 and K61 to 77, respectively, and various dimensional values, such as axle lengths, diameters, taper angles, dimensions of corner and neck are interactively set for each of the above codes. Further, in the roll-profile setting pictures in FIG. 6, the roll-profile setting module 7 serves to interactively set a length of the cylindrical part at code K01, the diameter and the profile characteristics (e.g., straight, sin. curve, arc curve, secondary curve).

In the setting example shown in FIGS. 5A and 5B, the number of steps of the axle part on the footstock side is nine, while the number of steps of the axle part on the headstock side is five. When a key of "f8" is pressed in the roll-profile setting picture shown in FIG. 5A or FIG. 5B, the roll-profile sketch process module 17 displays a roll-profile picture on the display 23, as shown in FIG. 7. It should be noted that this roll-profile can be optionally changed or deleted on the above-mentioned roll-profile setting picture.

When the item of "SET PROCESS CONDITION" is selected in the main menu, the process condition setting module 9 is activated. The module 9 displays process condition setting pictures on the display 23, as shown in FIGS. 8A and 8B. In the pictures of FIGS. 8A and 8B, various process conditions, such as a method of supporting the roll, a grinding pattern, circumferential speed of a main spindle, circumferential speed of a grindstone, feed speed, a grindstone on use (magazine No.) can be set interactively. These process conditions can be optionally changed or deleted on this process condition setting picture.

When the item of "SET GRINDING CONDITION" is selected in the main menu, the grinding condition setting module 11 is activated. The module 11 serves to display a grinding condition setting picture on the display 23, as shown in FIG. 9. In this picture in FIG. 9, various grinding conditions, such as a sort of No. 1 to No. 4 grindstones, the diameters of the grindstones, the minimum diameters of the usable grindstones, the widths of the grindstones, the maximum values of the circumferential speeds, kinds of selected dressers, various parameters in dressing, etc., can be set interactively. These grinding conditions can be changed or deleted on this grinding condition setting picture optionally.

Next, when the item of "SET PROCESS ORDER" is selected in the main menu, the process order setting module 13 is activated. The module 13 operates to display a process order setting picture on the display 23, as shown in FIG. 10. In FIG. 10, any one of the above locational codes K ## is interactively and optionally combined with any one of the above process codes J ## at every process order ( every line ), so that the process order of the cylindrical part and the axle parts is set while the process conditions are allocated to the respective parts. The locational codes K ## are inputted in a column of "OBJECT" in a setting table of the process order setting picture on the display 23, while the process codes J ## are inputted in a column of "PROCESS CONTENT" in the setting table. The process order is determined by the number (line number) of the locational codes K ## inputted in the column of "OBJECT".

It is also possible to input a term "COMMON" in the column of "OBJECT". In the line of "COMMON ", stand-by operations (e.g., preparation for grinding, automatic centering, contact of bearing metal etc.) and measuring operations (e.g., roll measurement, work check etc.) common to process of the respective parts are set collectively. Consequently, it is possible to decrease the number of human operation, and the programming time of the NC program is shortened and errors are reduced.

It will be easily understood that the arrangement allows both the process order and the combination of the locational codes K ## with the process codes J ## to be optionally changed, inserted or deleted on this process order setting picture.

Next, when the item of "PROGRAM GENERATE" is selected in the main menu, the automatic programming module 15 activates. Based on the combinations of the locational coded K ## with the process codes J ## set by the process order setting-module 13, the module 15 serves to obtain both of the roll-profile characteristics of the corresponding locational code K ## from the roll-profile setting module 7 and the process conditions of the corresponding process code J ## from the process-condition setting module 9. Additionally, obtaining the information of grindstone in the corresponding magazine from the grinding condition setting module 11 and the common parameters from the common parameter setting module 3, and further incorporating the above stand-by operations and the measuring operations designated in the line of "COMMON", the module 11 generates partial programs for the respective parts. Next, the module 11 rearranges the order of the partial programs so that they are executed in accordance with the process order set by the process-order setting module 13. Consequently, the NC program for executing a series of roll processes can be completed automatically. It will be understood that the automatic programming module 15 generates the partial program for each of the combinations of the locational codes K ## with the process codes J ## and that, if only changing the process order set in the process order setting module 13, the module 15 generates the NC program in which the process order is changed correspondingly and automatically.

In this specification, the partial programs are defined as ones including not only programs described by NC codes but also programs described by macro-codes containing many NC codes. In this case, because the partial programs are shortened while the macro-codes represent the operations, such a constitution allows the operator to understand the contents of process easily.

An example of the partial programs will be described with reference to FIG. 11. The NC program may be constituted by a program containing not only the process conditions, movement conditions, etc. but the common parameters, the grinding conditions or the like. In this case, due to the independent existence of the respective conditions and data, it is possible for the operator to check and confirm the contents easily.

Then, the automatic programming module 15 operates to automatically set respective process-starting positions that the respective partial programs define respectively, based on the whole roll-profile originating in the axle lengths of the respective parts, the diameters and the roll-profiles set by the roll-profile setting module 7, so that the grindstone does not interfere with the roll. In this case, due to the automatic establishment of the process-starting positions in the partial programs, there is no need to generate a NC program defining a path of the tool between one partial program and the other partial program individually. Thus, the operator does not have to modify the partial program for changing the process order of the respective parts of the roll.

Next, when the item of "TRANSMIT DATA TO F.D." is selected in the main menu, the NC program which the automatic programming module 15 generates automatically is transmitted to the FDD 25 and written onto a floppy disc installed in the FDD 25. Then, the floppy disc is installed in a FDD of a NC unit of the NC roll grinder, so that the NC program will be read in the NC unit. It should be noted that the transmission of the NC program from the automatic programming module 15 to the NC unit may be carried out by means of on-line communications, such as RS 232C.

According to the present invention, because of the respective modules 7, 9, 13, 15 as constituents of the automatic programming apparatus of the invention, it is possible to generate the NC program in a short time without errors in spite of a large number of axle steps of the roll. Furthermore, it is possible to cope with changes in process order of the respective parts and partial changes in the dimensional values (ex. the axle length, the diameter, the roll-profile, etc.) and the process conditions for a similar roll process without requiring the considerable NC programming knowledge.

Finally, it will be understood by those skilled in the art that the foregoing description is one of preferred embodiments of the automatic programming apparatus of the present invention, and that various changes and modifications may be made to the present invention without departing from the spirit and scope thereof.

What is claimed is:

1. An automatic programming apparatus for programming a numerical control program to apply various processes to a roll having a cylindrical part and at least one stepped axle part formed at both ends of said cylindrical part, said cylindrical part and said axle part being represented by locational codes and said various processes being represented by process codes, said apparatus comprising:

a roll-profile setting means for interactively setting dimensional values of said roll for each of said locational codes;

a process-condition setting means for interactively setting various process conditions for each of said process codes at every process code;

a process-order setting means for optionally and interactively combining said locational codes with said process codes for each of process order of said roll, thereby determining the process order of said cylindrical part and of said axle part while allocating said process conditions to said cylindrical part and said axle part; and an automatic programming means for programming a numerical control program for executing said processes on the basis of the combination of the process code and the locational code set by said process-order setting means;

wherein, to generate said numerical control program, said automatic programming means operates to obtain roll-profile of the locational code from said roll-profile setting means correspondingly and to obtain the process conditions of the process code from said process condition setting means correspondingly, thereby producing partial programs for said cylindrical part and for said axle parts; and wherein said automatic programming means further operates to arrange said partial programs so that said partial programs are executed in accordance with the process order set by said process-order setting means.

2. An automatic programming apparatus as claimed in claim 1, wherein said automatic programming means establishes respective process-starting positions defined by said partial programs, on the basis of the roll-profile originating in the dimensional values set by said roll-profile setting means.

3. An automatic programming apparatus as claimed in claim 2, wherein said process-order setting means is capable of setting common process characteristics in processing said cylindrical part and said axle part collectively.

4. An automatic programming apparatus as claimed in claim 3, wherein each of said partial programs includes a program described by numerical control codes and a program described by macro codes containing a plurality of numerical control codes.

5. An automatic programming apparatus as claimed in claim 4, wherein said numerical control program comprises a program containing the process conditions and moving conditions and a program containing common parameters, the roll-profile and tool conditions.

6. An automatic programming apparatus for programming a numerical control program to apply various processes to a roll having a cylindrical part and at least one stepped axle part formed at both ends of said cylindrical part, said cylindrical part and said axle part being represented by locational codes and said various processes being represented by process codes, said apparatus comprising:

a roll-profile setting means for interactively setting dimensional values of said roll for each of said locational codes;

a tool condition setting means for interactively setting information of tools at every number of a tool magazine of an automatic tool changer;

a process-condition setting means for interactively setting various process conditions for each of said process codes at every process code;

a process-order setting means for optionally and interactively combining said locational codes with said process codes for each of process order of said roll, thereby determining the process order of said cylindrical part and of said axle part while allocating said process conditions to said cylindrical part and said axle part; and an automatic programming means for programming a numerical control program for executing the processes on the basis of the combination of the process code, the locational code and the number of said tool magazine set by said process-order setting means;

wherein, to produce said numerical control program, said automatic programming means operates to obtain roll-profile of the locational code from said roll-profile setting means correspondingly and to obtain the process conditions of the process code from said process-condition setting means correspondingly and to obtain tool inflammations of the corresponding number of said tool magazine from said tool condition setting means, thereby generating partial programs for constituents of said cylindrical part and of said axle parts; and wherein said automatic programming means further operates to arrange said partial programs so that said partial programs are executed in accordance with the process order set by said process-order setting means.

7. An automatic programming apparatus as claimed in claim 6, wherein said automatic programming means establishes respective process-starting positions defined by said partial programs, on the basis of the roll-profile originating in the dimensional values set by said roll-profile setting means.

8. An automatic programming apparatus as claimed in claim 7, wherein said process-order setting means is capable of setting common process characteristics in processing said constituents of said cylindrical part and said axle parts collectively.

9. An automatic programming apparatus as claimed in claim 8, wherein each of said partial programs includes a program described by numerical control codes and a program described by macro-codes containing a plurality of numerical control codes.

10. An automatic programming apparatus as claimed in claim 9, wherein said numerical control program comprises a program containing the process conditions and moving conditions and a program containing common parameters, the roll-profile and tool conditions.

* * * * *